United States Patent

Regueiro

[11] Patent Number: 6,065,441
[45] Date of Patent: May 23, 2000

[54] DIVIDED CHAMBER DIESEL COMBUSTION SYSTEM

[75] Inventor: Jose F. Regueiro, Rochester Hills, Mich.

[73] Assignee: DaimlerChrysler Corporation, Auburn Hills, Mich.

[21] Appl. No.: 09/204,203

[22] Filed: Dec. 2, 1998

[51] Int. Cl.[7] .................................................. F02B 19/18
[52] U.S. Cl. ......................... 123/269; 123/286; 123/291; 123/293
[58] Field of Search .................... 123/269, 286, 123/291, 293

[56] References Cited

U.S. PATENT DOCUMENTS

| | | | |
|---|---|---|---|
| 2,658,493 | 11/1953 | Kloss | 123/286 |
| 3,220,389 | 11/1965 | Rinsum et al. | 123/291 |
| 4,119,065 | 10/1978 | Noguchi et al. | 123/291 |
| 4,122,805 | 10/1978 | Kingsbury et al. | 123/286 |
| 4,207,844 | 6/1980 | Schlotterbeck | 123/286 |
| 4,491,104 | 1/1985 | Fujii et al. | 123/291 |
| 4,596,214 | 6/1986 | Yagi et al. | 123/293 |
| 5,309,879 | 5/1994 | Regueiro | 123/286 |
| 5,392,744 | 2/1995 | Regueiro | 123/262 |
| 5,417,189 | 5/1995 | Regueiro | 123/262 |

Primary Examiner—Erick R. Solis
Attorney, Agent, or Firm—Kenneth H. Maclean

[57] ABSTRACT

A combustion system for a divided chamber engine that incorporates a pre-combustion chamber disposed to one side of the cylinder and that communicates with the main combustion chamber through two diverging transfer passages the open ends of which are aimed to direct the discharge from the pre-combustion chamber towards the sides of the combustion chamber and not at the center of the piston or the exhaust valve wherein the localized temperature at the piston's center is reduced and the exhaust valve temperature is not elevated.

35 Claims, 7 Drawing Sheets

DIVIDED CHAMBER DIESEL COMBUSTION SYSTEM

CROSS-REFERENCE TO RELATED APPLICATION

FIELD OF THE INVENTION

This invention concerns internal combustion engines and, more particularly, relates to an engine combustion system utilizing a particular pre-combustion chamber with a pair of transfer passages therefrom which are angled from each other and each serve to direct gases from the pre-combustion chamber toward the crown of the associated piston and for maximum efficiency to a pair of recessed pockets formed in the piston of a preferred embodiment.

BACKGROUND OF THE DISCLOSURE

In the late 1920's, divided chamber combustion systems for two-valve type cylinder heads opened the way for small high-speed diesel engines with designs by Harry Ricardo, and Mercedes-Benz. Many forms of divided chamber combustion systems have been proposed, but the two forms identified above are still the main designs for current diesel engines. The Ricardo design has since been applied to overhead valve (OHV) cylinder heads and to overhead camshaft (OHC) cylinder heads. Recently, some newer engines have been introduced with OHC and three valves per cylinder (two intakes and one exhaust). The basic design of the Ricardo "Comet" Mk Vb pre-combustion system (also often referred to as "swirl chamber" system) used on these engines, however, remains essentially the same as the original 1939 version. A minor change has emerged in recent Japanese engines consisting in the reversal of the relative positions of the fuel injector and the glow plug to eliminate air flow interference within the precombustion chamber otherwise caused by the glow plug.

While the "Comet" system provided excellent performance when first introduced, under present, more demanding operating conditions, it has many thermodynamic problems. One problem is that combustion does not actually take place as originally understood. The original perception was that a secondary combustion process took place in the dual pocket combustion cavity ("swirl pockets") formed in the main combustion chamber under high swirl conditions. The present thinking is that this was not accurate. In order to understand why the original perception is untrue, one needs to analyze the whole combustion process and the thermodynamic conditions immediately proceeding combustion. Following is such an analysis.

During engine operation, as the piston moves upwards towards the top-dead-center (TDC) position at the end of the compression stroke, air in the reduced cylinder volume moves towards the precombustion chamber and the area in the combustion chamber occupied by the "swirl pockets" through a well known squish process in which air is literally squeezed between closely spaced portions of the piston surface and the fire-deck surface of the cylinder head. Since the above identified "swirl pockets" (or main combustion volumes) were located to one side of the piston, a relatively large squish area was created over the remaining flat piston top from which air discharge was required. The air is discharged from the squish area by pumping energy delivered by the piston. The pumping energy is dissipated in air turbulence and friction as the air moves through the ever decreasing volume defining the squish clearance space between the piston and the cylinder head's fire-deck surface. Resultantly, energy in the form of heat is transferred to the piston through its top surface as well as to the cylinder head through its fire-deck surface. All of this heat energy is wasteful and must be subsequently absorbed by the engine oil and coolant. Finally, the heat energy must be disposed of through the cooling system which uses up additional energy by being required to drive the water pump and the radiator fan.

As can be understood, wasted pumping energy decreases the energy of the compressed air in the combustion chamber thereby lowering its compression pressure and temperature. Although this is detrimental under all engine running conditions, it is most wasteful during cold cranking and cold engine operation because the top piston surface and lower cylinder head deck surface are cold and thus absorb a maximum quantity of energy from the air moving from the squish areas. A high temperature differential between the surfaces and the air generates energy losses and, as is well known, whatever energy is lost must be compensated for by increasing the nominal or design compression ratio of the engine so as to reach the proper compression temperature for auto-ignition of the fuel in the combustion chamber. This, apart from being very expensive from the manufacturing standpoint, forces the engine to operate when hot at a compression ratio higher than needed for ignition and produces a combustion resulting in an increase in the firing pressure and the friction of the moving components of the engine, which must be made correspondingly stronger, and heavier. The higher firing pressure also requires a stronger engine structure which increases the vehicle's weight and fuel consumption. Moreover, the increased friction increases the fuel consumption and emissions as well as engine wear.

In addition, pumping air during the compression process from the squish areas between the cylinder and top surface of the piston and into the swirl pockets formed in the piston creates turbulence or swirl in these pockets. Such swirl is desirable in gasoline and direct injection diesel engines because it occurs before TDC and serves to accelerate combustion. However, in an indirect (divided chamber type) engine, it is of no benefit because combustion initially takes place before TDC in the pre-combustion chamber which has its own separate swirl-generating mechanism. Thus, by the time burning gases are discharged from the pre-combustion chamber into the main combustion chamber, the piston is already past TDC when previously created squish activity is past. Also, this divided chamber type of engine accelerates the secondary combustion process in the main combustion chamber by the kinetic energy of the products of prechamber combustion which exit through the transfer passages and by the highly reactive unburned fuel and the temperature of the burning mass. Accordingly, it is a waste to expend energy in creating swirl or turbulence.

Research has indicated that pumping work is substantially reduced if the area of combustion in the main combustion chamber (previously referred to as "swirl pockets") is expanded and centrally positioned so that any air that must be moved from the now volumetrically reduced and better-distributed smaller squish areas travels a minimum distance to the centrally located pockets. Although some air movement must always occur, the proportion of air movement from the squish areas is minimized and resultantly the energy expended is minimized.

The actual combustion process in the "Comet" systems begins in the pre-combustion chamber when fuel is introduced. The interior of the chamber is highly turbulent and confines a hot mass of air within hot pre-combustion chamber walls. Inasmuch as all of the fuel is introduced in the pre-combustion chamber and such chamber holds only a small portion of the total combustion air mass, the air-fuel (A/F) ratio within the pre-combustion chamber can be very rich, particularly under high load operation. Therefore, only a portion of this fuel burns with the air at a roughly stoichiometric A/F ratio. The rest of the fuel, which is heated and well mixed with the air and already formed products of combustion dissociates into highly reactive radicals. As the burning mass is expelled from the pre-combustion chamber, secondary combustion begins in the main combustion chamber. It was previously thought that this secondary combustion process occurred between the products of prechamber combustion and the fresh air in the piston swirl pockets, at a higher level of swirl, beginning from about five degrees ATDC and continuing for forty-five to fifty degrees of crankshaft rotation after TDC. However, research confirms that this is not very accurate. In reality, as the discharge from the pre-combustion chamber enters the piston pockets after TDC, the piston is rapidly descending during an expansion stroke and any air originally in these swirl pockets migrates to the ever increasing clearance volume being created over the large piston squash area between the top of the piston and the cylinder head's fire-deck; area which had little air when the piston was at TDC due to the minimum clearance.

A single, centrally located and relatively small transfer passage from the prechamber discharges its products of combustion as a relatively high-velocity torch and by a considerable expenditure of energy (pumping work). There is little incentive for the discharge to enter the piston's swirl pockets because the kinetic energy and momentum of the burning mass is too great to effect a change in direction and there is no other force to cause it to change direction. Specifically, the splitter formed on the piston top between the downstream circular ends of the "swirl pockets", intended to redirect the torch to enter the swirl pockets and burn therein while swirling, has descended with downwards movement of the piston and thus is no longer effective for changing the flow direction from the prechamber's transfer passage. Accordingly, secondary combustion continues past the pockets along the transversal centerline of the cylinder and follows the mass of air which has migrated to the far side of the chamber. This creates very high temperatures and very high levels of heat transfer to the piston because of the energy level and agitation of the combustion products. As a result, along a transversal line running between the valve bridge, the center of the piston's upper surface, and a portion of the exhaust valve seat a very high thermal loading is applied which could result in piston failure at the base of the splitter, as well as valve failure. Controlling these conditions and inhibiting valve failure requires the use of expensive materials.

The above thermal load problems have been more pronounced since engines began to be turbo-charged as indicated in a technical article written by J. A. Stephenson entitled "High Speed Diesels", appearing on page 245 in the 1988 issue of "Automotive Technology International". Moreover, confirmation of the above analysis can be found in the book entitled "Internal Combustion Engine Fundamentals" published by McGraw Hill Publishing Company (1988), and authored by J. B. Heywood. FIGS. 10–4 on page 499 of this book were supplied by Ricardo and Co. to Professor Heywood of the Massachusetts Institute of Technology and show in color pictures a sequential series of combustion phases. By following the flame propagation in the pictures from prechamber through combustion in the main chamber, the pictures confirm that the true development of the combustion process occurs transversely downstream of the piston's center and not in the swirl pockets.

Another characteristic of engines using the "Comet" pre-combustion system is that they require very tight clearances between the piston top and the fire-deck and valves. This is necessary to avoid squandering of the chamber's clearance volumes and reducing the compression ratio. These engines already require very high compression ratios which are difficult to achieve and control during production. The need for high compression ratios is due to the fact that the surface area of the pre-combustion chamber volumes also lose a great amount of heat to the engine coolant. When that energy loss is added to the pumping losses by high velocity passage of gases through the transfer port during the compression stroke, plus the wasted squish energy and heat transfer from it, the total detracts from the potential pressure and temperature at the time of injection and increases a delay in fuel ignition. Of course, this problem is worse during cold-start cranking and operation when much of the heat of compression is lost to the cold surfaces forming the combustion chamber and the prechamber walls. To avoid a resultant compression temperature too low to start the engine, the nominal or design compression ratio (NCR) was typically increased to a level unnecessary for normal operation. This requires a judicious control of clearance volumes in the main combustion chamber where only so much space can be allocated to the squish area. The problem then becomes a "chicken and egg" situation because the high NCR and resulting low main combustion chamber clearance volumes force a tight mechanical clearance between the piston and the lower deck of the cylinder head and between the piston and the valve heads.

In some prior engines, the clearance may be less that 0.001 or 0.002 inch under hot running conditions. This clearance would be just enough so that the piston and the valves do not contact during the valve overlap period of the cycle. Also, the valve lift is decreased during the overlap period occurring near TDC at the beginning of the intake period. The minimized valve lift causes unnatural valve timing events not seen in other type of engines. Specifically, the Intake Valve Opening (IVO) is forced to occur at a later than thermodynamically acceptable place in the cycle. Also, the Exhaust Valve Closing (EVC) is designed earlier than thermodynamically acceptable in the cycle. The resultant short overlap duration and minimum valve lift produces poor air and exhaust flows which has dire thermodynamic consequences. Thus, recompression spikes can occur under high-load, high-speed conditions as the exhaust valve is almost or totally closed while the intake valve is not open enough causing exhaust gases to be trapped in the combustion chamber with no place to go as the piston approaches TDC. The resultant recompression is undesirable as it produces negative work or in other words extracts energy from the piston. This will limit the engine's power and high speed potential and increase fuel consumption, smoke, noise, and emissions. Worse yet, the recompressed gas typically expands back into the intake manifold when the intake valve is opened. Resultantly, the exhaust gas heats the intake valve, the intake port, and the intake manifold. This heating reduces the volumetric efficiency of the engine and the EGR-like effect under high-speed, high-load conditions is not a welcome addition to the cylinder charge. Since the exhaust re-ingested into the cylinder takes the place of clean air, it also further reduces the volumetric efficiency and is the main cause of increased smoke and reduced power output. Also, the smoke carries highly abrasive carbon particles to erode pistons and piston rings. Further the particles are carried into the lubricating oil, thus forcing frequent oil changes. The exhaust re-ingestion also increases the fuel consumption, emissions, and the cylinder's thermal loading. The hot recompressed exhaust gas also transfers heat energy to the bridge between the valves and to the piston and further increases their thermal loading.

The abnormal timing schedule begets later than thermodynamically correct Intake Valve Closing (IVC), especially as two-valve engines require high valve lift and duration. Earlier than thermodynamically correct Exhaust Valve Opening (EVO), which occurs for the same reasons, not only wastes expansion energy which otherwise would contribute to engine power but instead becomes wasted pumping energy, as exhaust products in the exhaust system which is overloaded by such higher-energy exhausts products, must be mechanically evacuated by piston movement. Power output and mechanical efficiency are reduced. Fuel consumption, emissions, smoke, exhaust temperature, and thermal loading on combustion chamber components are increased.

In all of these prior swirl type, divided chamber engines, the main response to the problem of cracked bridge portions between the valves consists of drilling holes, one per cylinder, transversely through the metal of the lower deck of the cylinder head. The holes start opposite the location of the pre-combustion chamber and run through the bridge and discharge in front of the cast boss for the pre-combustion chamber. The sole purpose of these holes is to cool the bridge and exhaust valves. The approach is expensive because, apart from the drilling process itself, it also requires a cast boss and extra metal in the lower deck of the cylinder head. Each hole must be of relatively large diameter to avoid the risk of a broken drill bit and high cylinder head scrappage rates. The transversal hole must be plugged on the outside to avoid coolant leakage and must register with another vertical passage reaching through the cylinder head gasket and the top deck of the engine block into the block's water jacket. The metal boss at the bridge's center must be thick enough to run the drill causing kinks or bulges to exist in the intake and exhaust ports that reduce the port's flow coefficients. The worst result is that the thickened (actually widened) drill boss over the bridge will typically force the valves to be smaller than otherwise possible. The smaller valves reduce the engine's air flow capacity and the power associated with it. Thermodynamically, the long passage also forces unnecessary cooling of the fire deck and, with its discharge right in front of the pre-combustion chamber, induces additional heat losses from it. These losses also increase the cooling system loads which then require a larger water pump and radiator for increased parasitic losses and extra manufacturing cost.

Applicant's U.S. Pat. No. 5,309,879 issued on May 10, 1994; U.S. Pat. No. 5,392,744 issued on Feb. 28, 1995; and U.S. Pat. No. 5,417,189 issued on May 23, 1995 disclose solutions to correct the above described valve event problems and allow design of the engines with a lower NCR and provide better start-ability and low speed operation. A solution to the basic thermodynamic problem is provided by eliminating the swirl pockets of the original Comet engines and creating a dual pre-combustion chamber associated with dual valve-relief pockets in the piston. These valve-relief pockets serve to provide valve clearance for valve opening at a partial lift position during the overlap period of the engine cycle. They also permit desirable valve timing events. The valve overlap period is desirably increased by an earlier IVO and later EVC so as: to eliminate the possibility of recompression spikes; to allow proper scavenging of the products of previous combustion; to improve the ability to fill the chamber with clean air; and to reduce thermal loading of the combustion chamber. Thus, by advancing the IVO and retarding the EVC, it is also possible to desirably advance the IVC and retard the EVO. The earlier IVC produces higher compression pressures during cranking and better start-ability. The thermodynamic improvement results in an increase in the effective compression ratio and increased trapped volumetric efficiency resulting from less blow-back of air from the cylinder into the intake manifold during the early stages of the compression cycle. The later EVO extracts more energy from the combustion gases and expels a mass of lower energy exhaust during the exhaust process. It also lowers the energy expenditure in carrying out the exhaust process; which reduces fuel consumption, emissions, and thermal loading.

The above identified patents also offer solutions for reducing high thermal loading on the valve bridge and on the top of the piston. For example, the '744 patent discloses a four valve cylinder head with a centrally located pre-combustion chamber incorporating four transfer passages. This design moves the secondary combustion from the center of the cylinder outward into the valve-relief pockets provided in the piston. The '879 patent discloses a four-valve cylinder head with a side located pre-combustion chamber with a piston top designed to spread out the secondary combustion to overlie a greater area of the piston's top surface but still retains a certain amount of the combustion at the center of the piston. The '189 patent, which is directly applicable to two-valve engines using the aforementioned "Comet" system, addresses the problem not only by performing most of the secondary combustion in the valve-relief pockets in the piston and allowing desirable valve timing events for generating improved thermodynamic results but, in addition, by using a funnel type transfer passage. This last design improves the air flow into the pre-combustion chamber which results in an increase in its air-filling characteristic as well as the amount of combustion taking place in the pre-combustion chamber. As a result, the amount of combustion taking place in the main combustion chamber is reduced and, thereby, the thermal load on the valve bridge and the piston is lessened. More importantly, however, the funnel design diffuses the torch of the products of the pre-combustion chamber from the transversal center of the cylinder and more into the valve pockets thus reducing the localized temperatures over the center-point of the piston. Although this design is an improvement, the single transfer passage still does not totally eliminate the major problem resulting from the high energy of combustion along the cylinder transversal centerline atop the piston and the high thermal loads associated with this direction. In other words, these previous designs do not eliminate the need for a transversal coolant passage as described above which is used to reduce the valve bridge temperature.

What is necessary to correct the aforedescribed consequences is a system that desirably directs the flow of burning gases from the pre-combustion chamber to desired dual locations in the combustion chamber. The subject application provides an improved divided chamber combustion system which inhibits concentration of the secondary combustion at the piston's center and redistributes the secondary combustion more evenly over the total crown surface of the piston. Thus, a more desirable thermodynamic valve timing can be utilized as described in my earlier patents. The improved design should provide a higher volumetric and mechanical efficiency and allow the modified engine parts to be bodily interchangeable with prior "Comet" or swirl-chamber type engines with two or three valves. The new design will also help eliminate the necessity for the costly drilled cooling passage through the valve bridge as well as allow straighter and smoother inlet and exhaust ports to the combustion chamber which in turn allows use of larger valves and exhibits a higher flow coefficient. Another result would be faster combustion through improved air utilization and potentially higher engine speeds both of which would increase power output and reduce the fuel consumption, gaseous emissions, smoke creation and engine noise.

SUMMARY OF THE INVENTION

Accordingly, the present invention proposes a new of form of a divided chamber type indirect injection engine with the pre-combustion chamber located to one side of the main combustion chamber and designed to be used with a cylinder head with two and even three valves. Objects of the design are to achieve increased power output and improved start-ability with lower fuel consumption, emissions, smoke, noise, and reduced thermal loads on the piston and valve bridges at the center of the main combustion chamber. Broadly stated, the subject combustion system incorporates a new and improved dual outlet pre-combustion chamber which directs burning fuel therefrom through a pair of transfer passages towards a piston top. In a preferred configuration, the piston top has depressions or pockets for accommodating intake valve and exhaust valve movement into it during the overlap period near TDC. In addition, each of these pockets is aligned with one of the two transfer passages of the pre-combustion chamber so as to serve as main combustion volumes in which a major portion of the main-chamber combustion process takes place. The pockets are preferably interconnected by a pair of diverging channels also formed in the piston top and substantially aligned with the precombustion chamber transfer passages.

More specifically, the combustion system according to the present invention forms a part of an internal combustion engine having a cylinder bore with a piston located in the bore for reciprocal movement therein. A cylinder head is fixed over the cylinder bore and piston to cap the top opening of the cylinder and to define a combustion chamber with an intake passage extending in the cylinder head through which air flow is controlled by an intake valve located in the intake passage. Similarly, an exhaust passage is formed in the cylinder head and an exhaust valve is located in the exhaust passage for controlling exhaust gas flow from the combustion chamber.

In the preferred form of the invention, the cylinder head supports a pre-combustion chamber assembly positioned to one side of the main combustion chamber and having a pair of outlet transfer passages communicating with the main combustion chamber. One end of each of the transfer passages opens to the interior of the pre-combustion chamber and the opposite end of each of the transfer passages opens to the main combustion chamber. The top surface or crown of the piston preferably has a first pocket and a second pocket with each pocket being sized and positioned directly below the valves such that when the intake valve and the exhaust valve are in partially opened positions which occurs when the piston is at or near TDC, these pockets receive the intake valve and the exhaust valve to prevent contact of the valves with the piston. The pre-combustion chamber's transfer passages are oriented so that the flow of fluid therethrough into the main combustion chamber is into a respective pocket. In addition, the preferred embodiment has a pair of separate diverging channels formed in the top surface of the piston with one of the channels serving to solely interconnect the outer end of one of the transfer passages with the first pocket and with the other of the channels serving to solely interconnect the outer end of the other of the pair of transfer passages with the second pocket so as to guide the gases from the pre-combustion chamber along two substantially independent paths to the first and second pockets and thereby prevent concentration or localization of high temperature near one location of the piston.

In the preferred form of the present invention, each of pre-combustion chamber's transfer passages is designed to act as a funnel disposed with a larger opening of the funnel adjacent the main combustion chamber and the smaller opening of the funnel adjacent the interior of the pre-combustion chamber. During the compression stroke and with this design, filling of the interior of the pre-combustion chamber with air from the combustion chamber is accomplished with less pumping effort because of the higher flow areas and flow coefficients of the converging passages. This allows a design of the pre-combustion chamber of lesser volume and surface area so as to reduce the chamber's ability to undesirably give up heat to the engine coolant. This can also serve to increase the proportion of fuel burned in the pre-combustion chamber, which correspondingly reduces the proportion of burn and resultant thermal load which would otherwise occur in the main combustion chamber. These tapered transfer passages also act as diffusers when discharging the products of combustion into the main combustion chamber and generate a wider, faster coverage of the combustion chamber volume particularly in the pockets formed in the piston, without acting as a torch directly extending to the other end of the main chamber. Resultantly, a faster secondary combustion would be expected and without having to impart much kinetic energy to the gases as is typical in conventional swirl-type engines using straight transfer passages with a relatively small cross-section.

In a modified form of the present invention, the transfer passages can be designed so as to form a large single opening on the interior end of the pre-combustion chamber with the opening bifurcating into a pair of funnels one of each conmmunicating with a corresponding channel configuration formed on the top surface of the piston, and leading to the pair of main piston pockets. This modified design geometrically converts the two smaller openings into the interior of the pre-combustion chamber into a larger common entry thereto, thus with an increased effective cross-sectional area. It also decreases the effective length of each branch and reduces the overall surface area which decreases opportunity to transfer heat to coolant and create flow-friction effects. In addition, the ability for rapidly filling the pre-combustion chamber's interior is also enhanced as well as achieving a higher combustion efficiency and shorter combustion duration after ignition begins. The modified form also effectively incorporate some of the transfer passage's volume in common with the interior of the pre-combustion chamber which increases the quantity of combustion in the pre-combustion chamber particularly under high load conditions. It also reduces the proportion of combustion that takes place in the pockets atop the piston which further improves the whole combustion process while reducing thermal loading on components in the main combustion chamber.

Accordingly, one object of the present invention is to provide a new and improved combustion system for a divided chamber engine characterized by an improved gas-transfer between the pre-combustion chamber and the main combustion chamber, i.e., decreased air flow resistance into the interior of the pre-combustion chamber during compression resulting in an increased potential energy release latter during the pre-combustion portion of the engine cycle and improved flow of burning gas from the interior of the pre-combustion chamber into the main combustion chamber during the expansion portion of the engine cycle. This reduces the heat loss attributable to the transfer passages and increases the combustion rate in the main combustion chamber without increasing the firing pressure and derivative mechanical loading of the engine components.

Another object of the present invention is to provide a new and improved combustion system for a divided chamber engine that helps eliminate high thermal loading on components in the combustion chamber particularly located near the chamber's center and spreads the secondary combustion process in the main combustion chamber from dual transfer passage outlets to offset valve pockets and towards squish regions of the piston located along the outer edges of the main combustion chamber.

A further object of the present invention is to provide a new and improved combustion system for a divided chamber engine that incorporates a generally spherically shaped pre-combustion chamber positioned to one side of the cylinder and communicating its interior with the main combustion chamber through two diverging transfer passages whose axes and open ends are oriented with respect to a pair of independent channels formed on the piston top that serve to guide the discharge from the interior of the pre-combustion chamber away from the centerline and central region of the combustion chamber.

A further object of the present invention is to provide a new and improved combustion system for a divided chamber engine that incorporates a generally spherically shaped pre-combustion chamber positioned to one side of the cylinder and communicating its interior with the main combustion chamber through two diverging transfer passages whose axes and open ends are oriented with respect to a pair of independent channels formed on the piston top that serve to guide the discharge from the interior of the pre-combustion chamber away from the centerline and central region of the combustion chamber and towards a pair of valve pockets formed in the piston top for secondary or main combustion.

BRIEF DESCRIPTION OF THE DRAWINGS

Other objects, advantages and features of the present invention will become apparent from the following detailed description of the invention when taken in conjunction with the following drawings in which:

FIG. 5 is a top plan view of the piston which forms a part of the combustion system of the modified cylinder head of FIG. 4;

FIG. 7 is a top plan view of the piston which forms a part of the combustion system of the further modified cylinder head of FIG. 6.

DETAILED DESCRIPTION OF THE INVENTION

Figure 1:
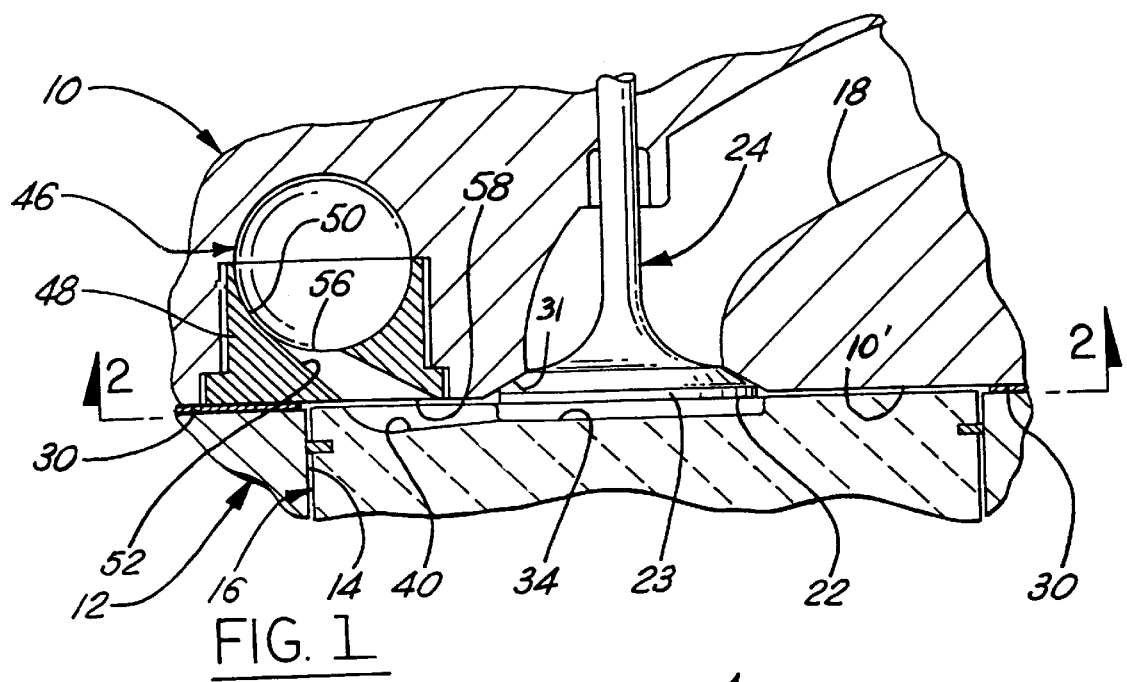
FIG. 1 is a segmented side elevational view of a cylinder and piston assembly for a divided chamber diesel engine illustrating one embodiment of the present invention.
Figure 2:
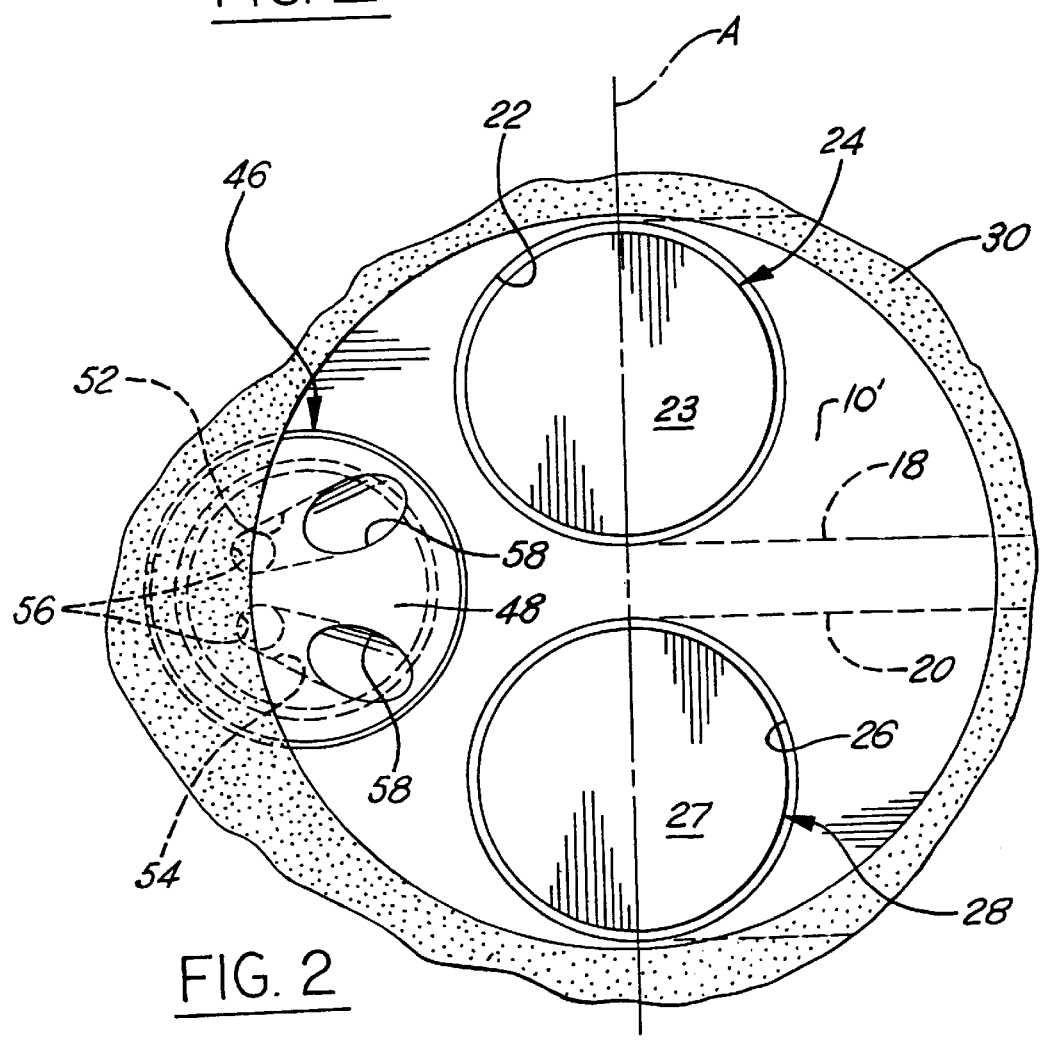
FIG. 2 is a fragmentary bottom plan view of the cylinder head taken on line 2—2 of FIG. 1 and looking in the direction of the arrows.

Referring now to the drawings and more particularly to FIGS. 1 and 2 thereof, a cylinder head 10 and an engine block 12 of a multi-cylinder internal combustion engine are shown provided with a cylinder 14 and a piston 16. Although only one cylinder 14 and piston 16 are shown, it should be understood that any other cylinder and piston of the engine are substantially identical in structure and function. The cylinder head 10 is fastened to the engine block 12 by fasteners (not shown) and the longitudinal center-line of the engine is indicated by the letter "A" as seen in FIG. 2. Although not shown, each piston is conventionally connected to a crankshaft which, in turn, is connected via a timing mechanism to a camshaft that serves to time the opening and closing (as will be explained hereinafter) of an exhaust valve and an intake valve located in the cylinder head 10.

The cylinder 14, piston 16, and cylinder head 10 form a main combustion chamber with the top surface of the piston 16 serving as the bottom wall of the chamber while the opposed bottom surface of the cylinder head 10 forms the top wall and the cylinder 14 per se forms the side wall of the main combustion chamber as the piston 16 moves downward from its TDC (top dead center) position seen in FIG. 1. As best seen in FIG. 2, the cylinder head 10 is provided with an intake port 18 and an exhaust port 20 which terminate at one end with an annular intake passage 23 of the intake valve 22 and the valve seat 31 formed on the cylinder head, and is adapted to be closed by the head portion 23 of the intake valve 24. The annular exhaust passage 26 is formed between the valve head portion 27 of the exhaust valve 28 and the valve seat (not shown) formed on the cylinder head, and is adapted to be closed by the head portion 27 of an exhaust valve 28. A conventional gasket 30 is interposed between the cylinder head 10 and the engine block 12 with a circular cut-out aligned over each cylinder of the engine.

Figure 3:
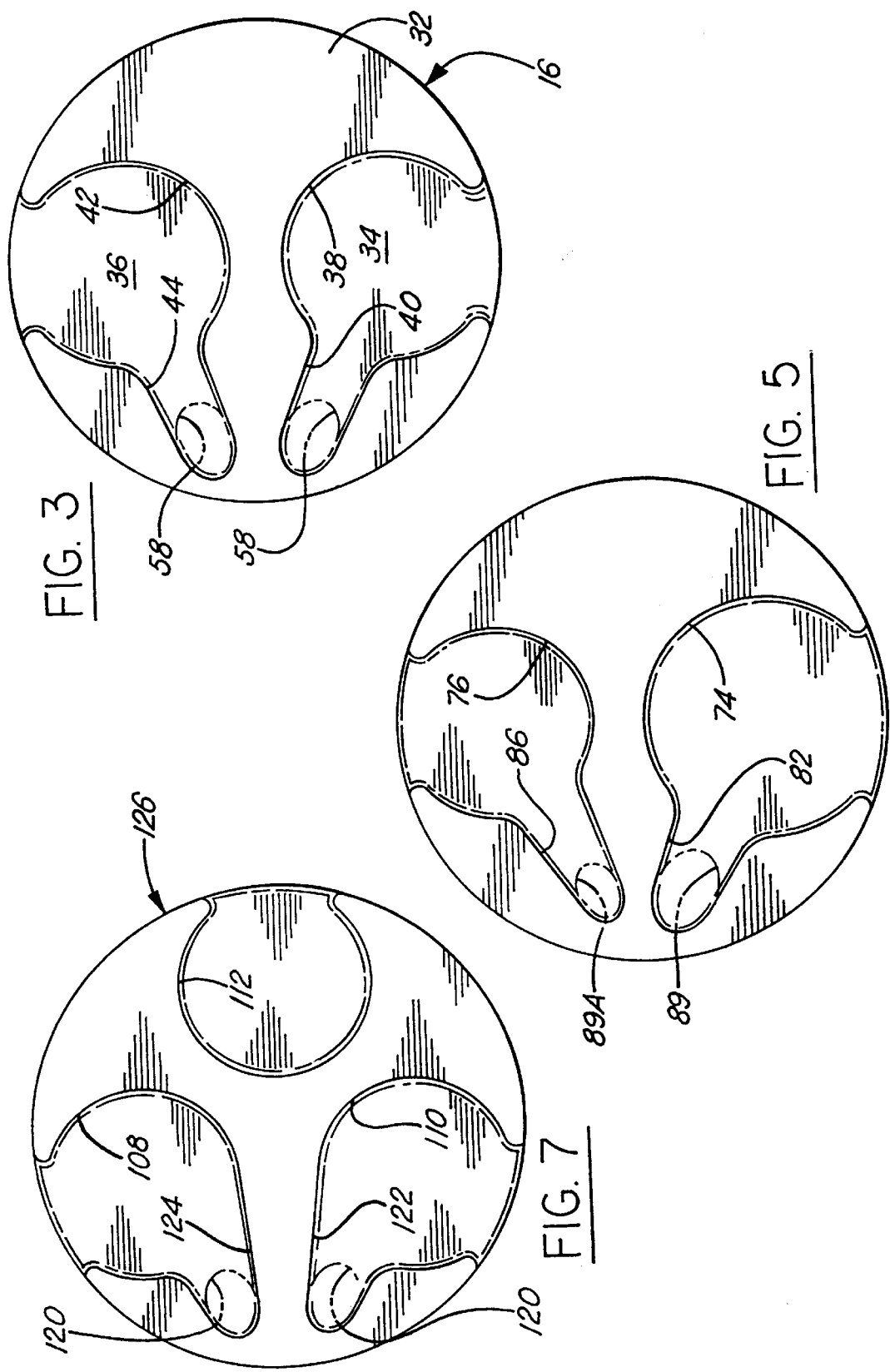
FIG. 3 is a top plan view of the piston shown in FIG. 1.

As seen in FIGS. 1 and 3, the piston has a flat top surface portion 32 that conforms to the flat configuration of the bottom surface 10' of the cylinder head 10 and surrounds a pair of generally "light-bulb" shaped depressions 34 and 36 formed in the top surface portion 32 of the piston 16.

Depression 34 provides a circular valve pocket 38 below the head portion 23 of the intake valve 24 that connects with a channel 40 that extends at an angle towards one side of the piston 16. Similarly, the depression 36 provides a circular valve pocket 42 below the head portion 27 of the exhaust valve 28 that connects with a channel 44 that also extends at an angle towards the one side of the piston 16. The top flat surface portion 32 of the piston 16 forms a squish area with the aforementioned bottom surface 10' of the cylinder head 10. The limited distance between the squish area on the piston and the bottom surface 10' of the cylinder head 10, called the "bump clearance", promotes higher compression ratios as the piston 16 reaches TDC on its compression stroke for the start of combustion. The pockets 38 and 42 are of slightly larger diameter than the valve head portions 23 and 27, respectively, and serve a dual purpose. First, the valve pockets 38 and 42 allow the valves 24 and 28 a substantial partial lift during the overlap period when the piston 16 is at or near TDC. This prevents piston motion interference and allows the intake valve 24 to open earlier and the exhaust valve 28 to close later to achieve higher lifts around TDC thus increasing the open valve area and the gas flow during the overlap period to more thermodynamically acceptable values. A second purpose for the valve pockets 38 and 42 is to serve as main combustion chambers as will be more fully explained hereinafter. Consequent to the earlier opening of the intake valve and later closing of the exhaust valve, the closing of the intake valve can also be executed earlier; and the later opening of the exhaust valve improves the thermodynamic cycle for increasing engine power and efficiency accompanied by lower emissions, smoke, and noise with improved startability.

As alluded to above, the pocket 38 is located and sized to receive the head portion 23 of the intake valve 24 when the valve 24 is in the partially open position and the piston 16 is at or near TDC during the overlap period. In addition, the pocket 42 is located and sized to receive the head portion 27 of the exhaust valve 28 when the valve 28 is in the partially open position and the piston 16 is at or near TDC and also during the overlap period. Preferably, each of the pockets 34 and 36 has a flat bottom surface of substantially equal depth. As seen in FIGS. 1 and 3, each of the channels 40 and 44 is tapered with its wider section located adjacent the associated pocket and the narrower section located below a pre-combustion chamber 46 disposed in the cylinder head 10 to one side of the cylinder 14. Although the channels 40 and 44 are shown in FIG. 3 as being identical in configuration, both contoured to increasingly expand their width from their narrowest ends until they meet their associated pockets, they can be varied in design; the important consideration being that each channel provides the desired direction and amount of discharge into the associated pocket.

As seen in FIGS. 1 and 2, the pre-combustion chamber 46 includes a lower cup 48 which preferably has an internal hemispherical surface 50 defining the bottom half of a prechamber 46. Although not shown, the cylinder head 10 supports a conventional fuel injector for providing fuel into the prechamber and also supports a conventional glow plug for initial start-up of the engine. The lower portion of the cup 48 is formed with a pair of identical tapered transfer passages 52 and 54 each having its upper open end 56 being smaller than its lower open end 58. As seen in FIGS. 2 and 3, the transfer passage 52 has its longitudinal center axis and its lower open end 58 aligned with the channel 40 while the transfer passage 54 has its longitudinal center axis and its lower open end 58 aligned with the channel 44. Thus, the channels 40 and 44 are oriented so as to receive the early phase of the discharge from the pre-combustion chamber 46 at the point when the piston 16 is around TDC at the end of the compression stroke or at the beginning of the expansion stoke. Moreover, the channels 40 and 44 serve to guide and transfer the discharge products of pre-chamber to the pockets 38 and 42 where a large portion of the air in the main combustion chamber is located at that point of time. Under high-load conditions, the discharged products of combustion of the pre-combustion chamber 46 carry a high proportion of unburned excessive fuel at a high temperature, partially decomposed and highly reactive. Upon entering the pockets 38 and 42 with their high air mass, this mass of burnt and unburned products of combustion reacts rapidly with the mass of air in the guide channels 40, 44 and the pockets 38 and 42 to affect quick and complete combustion in both volumes. During this period, however, the piston 16 is moving away from TDC in the expansion stroke, opening up a large volume in the squish area (squish volume) at the side of the cylinder 14 opposite the pre-combustion chamber 46. Some of the mass already burnt in the pockets 38 and 42, as well as some not burnt, migrate into the new found areas to complete the combustion process. Note that FIG. 1 shows the portion of the channel 40 immediately below the lower open end 58 of the transfer passage 52 provided with a deeper section which gradually rises to the depth of the pocket 34. Although not shown, a similar design is provided in the channel 44 below the lower open end 58 of the transfer passage 54. The advantage of this design is the discharge from the pre-combustion chamber 46 has a gradual transition which serves to provide a smooth flow from the transfer passages 52 and 54 to the pockets 38 and 42, while also providing a high volume of pre-chamber products of combustion to affect the final complete burning of the fresh air which also migrates ti the squish volumes directly below the pre-combustion chamber.

Figure 4:
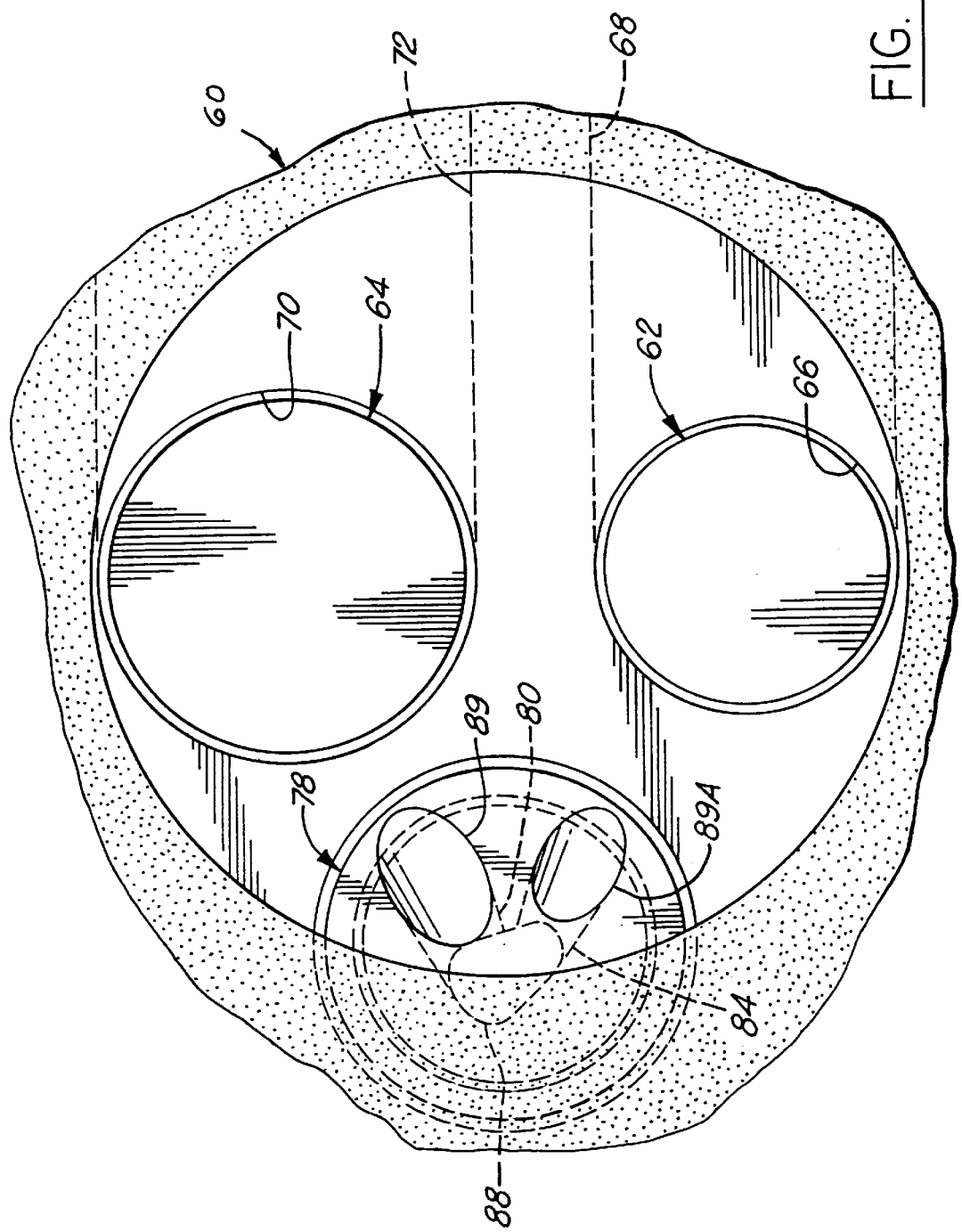
FIG. 4 is a fragmentary bottom plan view similar to that of FIG. 2 of a modified cylinder head incorporating a pair of valves one of which is larger in diameter than the other.

FIGS. 4 and 5 show a modified version of the combustion system seen in FIGS 1–3. In this instance, the cylinder head 60 is provided with one valve 62 that is smaller in diameter than the other valve 64. As is well known to those skilled in the art of engine design, the small valve 62 with the smaller valve head is utilized to control flow in an annular exhaust passage 66 leading into an exhaust port 68, thus serving as the exhaust valve. The large valve 64, the head portion of which is located in an annular intake passage 70 leading to an intake port 72, serves as the intake valve. One difference between this combustion system and that seen in FIGS. 1–3 is that the valve pocket 74 for the valve head of the intake valve 64 has a larger volume than the valve pocket 76 for the valve head of the exhaust valve 62. This is due to the fact that the diameter of the valve pocket 74 is greater than that of the valve pocket 76 while the depth of the two pockets is the same. Inasmuch as the pocket 74 has a larger volume than the pocket 76, and operates at higher air density because the intake valve runs cooler than the exhaust valve, with lower heat radiated by the valve into the associated valve pocket's volume, a thermal difference will occur during discharge from a pre-combustion chamber 78 causing the pocket 74 to have a lower temperature than the pocket 76. This being the case, it is preferable to have the products of prechamber combustion directed to the pockets 74 and 76 proportioned to the air mass in each pocket so as to achieve secondary combustion in each of them at similar Air/Fuel (A/F) ratios. This will avoid the overly rich combustion that would take place in the small pocket 76 and the overly lean combustion which would occur in the large pocket 74. Without proportioning the discharge of the products of combustion from the pre-combustion chamber 78, combustion in the small pocket 76 could approach or reach stoichiometric A/F ratio conditions producing smoke, high levels of NOX and poor combustion efficiency as well as high temperature and thermal loading in the critical exhaust valve area. Also, combustion in the large cool pocket 74 would occur under very lean conditions with poor air utilization so as to produce less power than could be optimal from it. To avoid this unbalanced burning, the combustion system seen in FIGS. 4 and 5 is intended to even the mixture and burning rates between the two pockets 74 and 76 by providing a larger transfer passage 80 and guide channel 82 to feed the larger pocket 74 and a smaller transfer passage 84 and guide channel 86 to feed the smaller pocket 76. In addition, it can be seen in FIG. 4 that the inner open ends of the transfer passages 80 and 84 are joined together at a common inner opening 88 formed in the inside hemispherical surface of the lower cup 79 of the pre-combustion chamber 78 while the outer open ends 89 and 89A of the transfer passages 80 and 84 are aligned with the channels 82 and 86 as seen in FIG. 5. It will be understood that the size of the transfer passages 80 and 84 will be a function of the relative effective air volume of the pockets 74 and 76 and the guide channels 82 and 86 so that the discharge is properly apportioned between the two and similar A/F ratios are achieved in both pockets. In striving for similar A/F ratios in the pockets 74 and 76, the flow area ratios of transfer passages 80 and 84 must consider their own individual flow coefficients as well as those from the guide channels 82 and 86 plus the difference in air density in pockets 74 and 76, mostly due to the hotter environment in pocket 76 due to the hotter exhaust valve.

Figure 6:
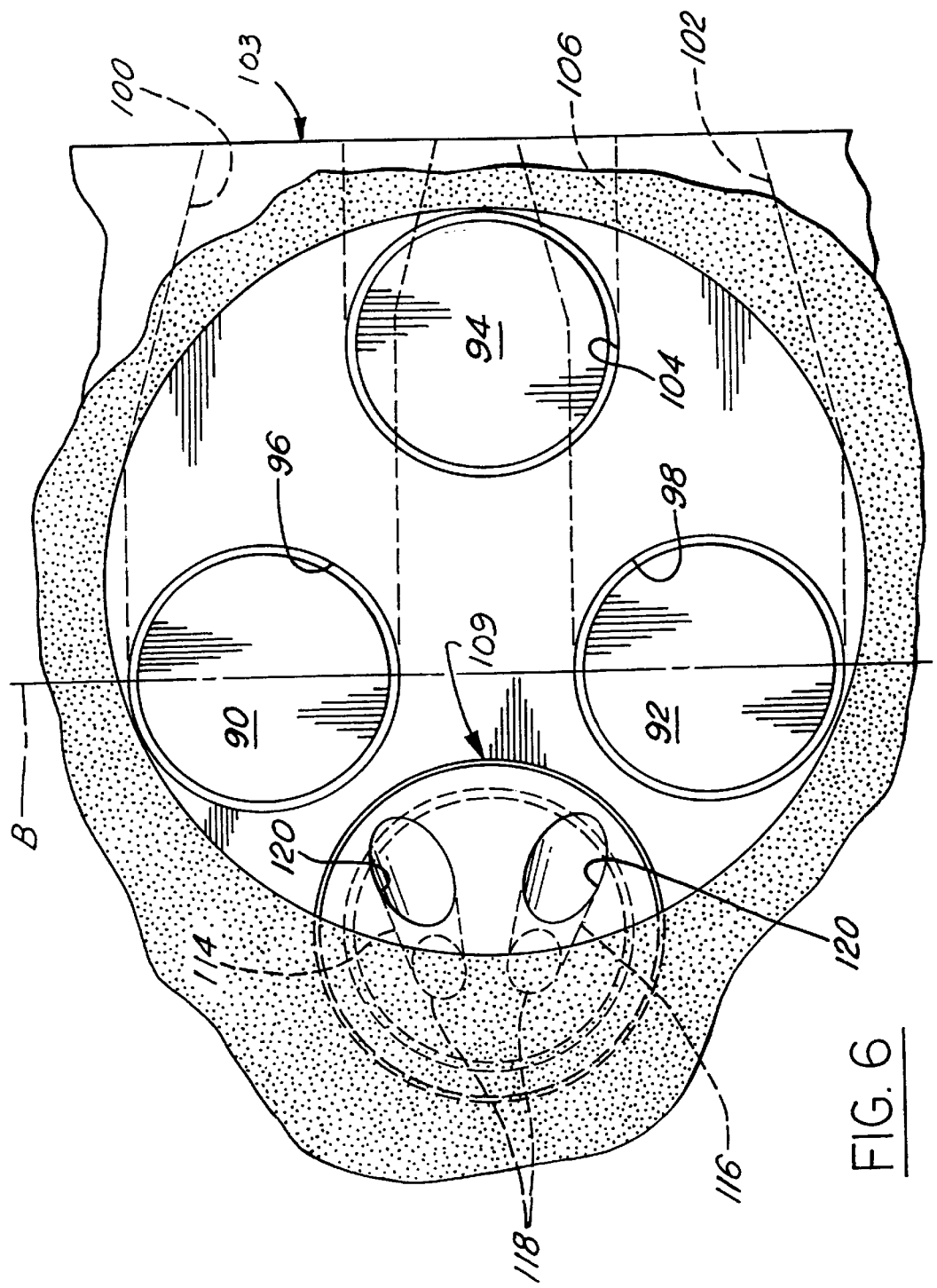
FIG. 6 is a fragmentary bottom plan view similar to that of FIG. 2 of a further modified cylinder head incorporating three valves and a pre-combustion chamber of the type shown in FIGS. 1 and 2.

FIGS. 6 and 7 show a combustion system for a conventional cylinder head of a three valve per cylinder engine. In this case the combustion system at each cylinder includes two intake valves 90 and 92 and one exhaust valve 94 all of which are of equal diameter as shown (typically used in practice) and driven by a single overhead camshaft (not shown) through finger followers (not shown). The valve heads of the intake valves 90 and 92 are located in an annular exhaust passages 96 and 98, respectively, that connect with intake ports 100 and 102 formed in the cylinder head 103. The valve head of the exhaust valve 94 is located in an annular exhaust passage 104 that connects with an exhaust port 106. The intake valves 90 and 92 are disposed along a center line "B" which is parallel to the longitudinal centerline of the engine with the exhaust valve 94 being located in the remaining space on the side of the cylinder opposite a pre-combustion chamber 109. When using two intake valves, the total valve curtain area during overlap can typically be up to about 40% higher than when a single intake valve is used. As a result, there is no need to provide each of the valves 90 and 92 with pockets as deep as those used in the combustion systems described above and shown in FIGS. 1–5. Therefore, the depth of the pockets 108 and 110 for the valve heads of the intake valves 90 and 92 can be less than the value of that of a single intake valve design. However, inasmuch as the single exhaust valve 94 is disproportionately smaller than ones used on two-valve engines, it is necessary to provide as much depth for the exhaust valve pocket 112 so as to allow the exhaust valve as much lift as possible during overlap; also as much total lift and opened duration as possible.

As with the previously described combustion system seen in FIGS. 1–3, the pre-combustion chamber 109 in FIGS. 6 and 7 is preferably formed with a pair of identical tapered transfer passages 114 and 116 each having its upper open end 118 being smaller than its lower open end 120. As seen in FIG. 7, the transfer passage 116 has its longitudinal center axis and its open end 120 aligned with the channel 122 while the transfer passage 116 has its longitudinal center axis and its open end 120 aligned with the channel 124. Thus, the channels 122 and 124 are oriented so as to receive the early phase of the pre-combustion chamber discharge at the point when the piston 126 is around TDC at the beginning of the expansion stroke. Moreover, the channels 122 and 124 serve to guide and transfer the discharge products of pre-chamber combustion away from the center of the upper surface of the piston 126 and to the pockets 108 and 110 where a large portion of the air in the main combustion chamber is located at that point of time. Eventually, as the piston moves downward in the cylinder, combustion will continue first by using the air in the squish volumes over the piston, and then extending to use of the air remaining in the exhaust pocket 112.

Figure 8:
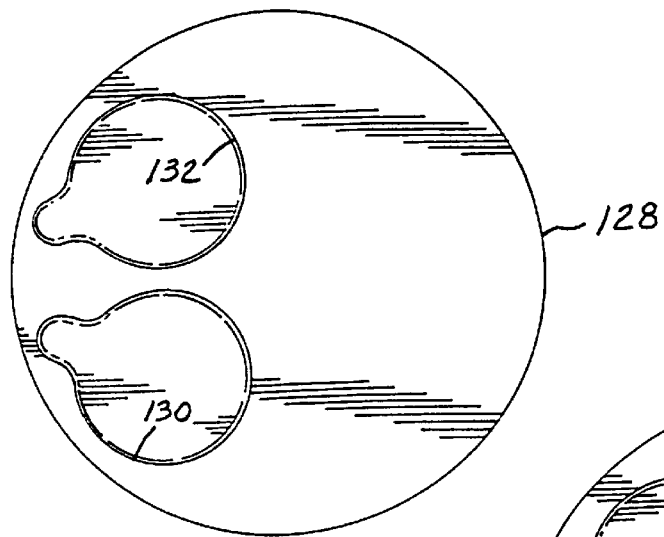
FIGS. 8–9 are top plan views of modified pistons which form a part of a combustion system utilizing a cylinder head like the cylinder head of FIGS. 2, 4, or 6 but with the main combustion pockets on the pistons positioned similarly to the "swirl pockets" of the Comet system but modified in shape so that their independent channels line-up with the twin transfer passages of the prechamber as shown in FIG. 2.

FIG. 8 shows a modified piston head 128 similar to the piston head shown in FIG. 3 but with the two main combustion pockets 130, 132 independently from each other and offset to the left from the centerline, roughly corresponding in position to that of the swirl pockets of the Comet system. This configuration is similar to the earlier engines as previously described above as background. In this instance, the associated cylinder head (similar to that shown in FIG. 2) is provided with one intake valve and one exhaust valve also located in similar central or near-central positions. With this arrangement, the flame spreads outward rather than being concentrated at the center of the piston top, but the valves can only have very shallow relief pockets formed on the piston top; or no pockets at all, limiting the possibilities for improved valve timing events.

Figure 9:
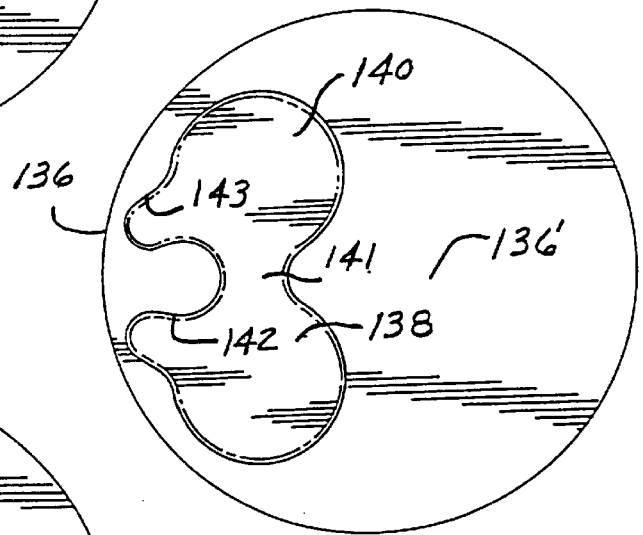

A further modification is seen in FIG. 9 which is similar to the modification of FIG. 8 but in which the piston 136 has a flat top surface 136' that conforms to the flat configuration of the bottom surface 10' of the cylinder head 10 (see FIG. 1). The flat surface 136' surrounds a pair of depressions 138, 140 joined together by a connector 141. In essence, this common combustion pocket is very similar to the previously described Comet system. However, it differs in that it uses two channels, 142 and 143, lined up with the pre-chamber transfer passages (52, 54 in FIG. 1), instead of one single passage as with the Comet system. Again, the flame spreads outward rather than being concentrated transversely at the center of the piston top. With this design shown in FIG. 9, little or no improvement in valve timing events is possible valve relief pockets are formed on the top of the piston (not shown).

Figure 10:
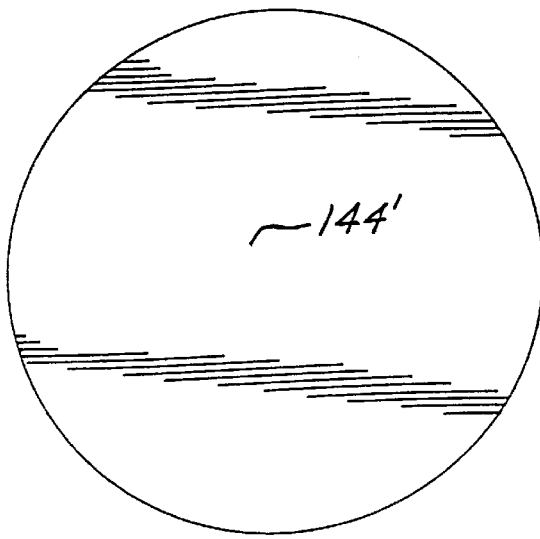
FIGS. 10–11 are top plan views of pistons which form part of a combustion system utilizing a head like that of FIGS. 2, 4, and 6 but without the main combustion pockets (or "swirl pockets" of the Comet system) formed on the piston top.

A further modification is seen in FIG. 10 in which the piston 144 has a flat top surface 144' that conforms to the flat configuration of the bottom surface 10' of the cylinder head 10 (see FIG. 1). This planar flat surface 144' provides no pockets or recesses for valves. Of course, with such a piston, the bump clearance spacing between the piston top and the cylinder head need to be increased to maintain a Nominal Compression Ratio. The increased bump clearance allows slightly more valve overlap and improved valve timing events than the original Comet system, but not as much as the modifications which are the subject of this application, as shown in FIGS. 1–7. Likewise, the valve lift and perhaps the actual valve timing might require modification. The lack of pockets to form combustion areas as shown in FIGS. 1–7 negates some of the advantage of the subject dual discharge pre-combustion chamber but it still directs the burning gasses outward and away from the central region of the combustion chamber to inhibit thermal loading at the center of the piston and the valve bridge.

Figure 11:
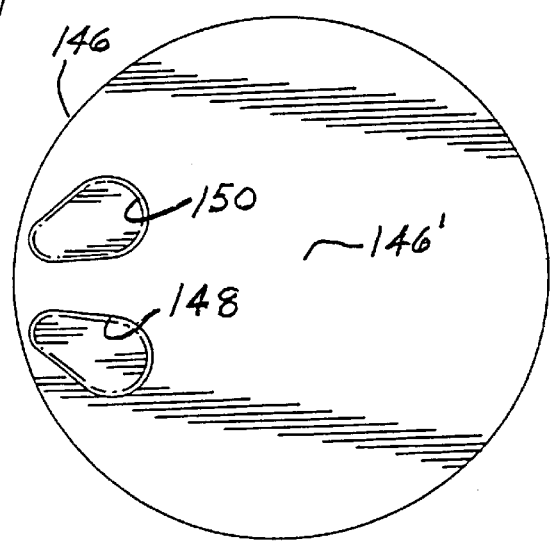

A further modification is seen in FIG. 11 in which the piston 146 has a substantially flat top surface 146' that conforms to the flat configuration of the bottom surface 10' of the cylinder head 10 (see FIG. 1). This surface 146' has no recesses for accepting movement of the associated valves and no defined combustion or "swirl pockets" as with the original Comet system. However, it does include a pair of troughs 148, 150 for passage of hot gasses as they exit the pre-combustion orifices. This allows the flame to spread outward and avoid burning at the center of the piston or at the impingement points of the pre-chamber discharge torches.

Figure 12:
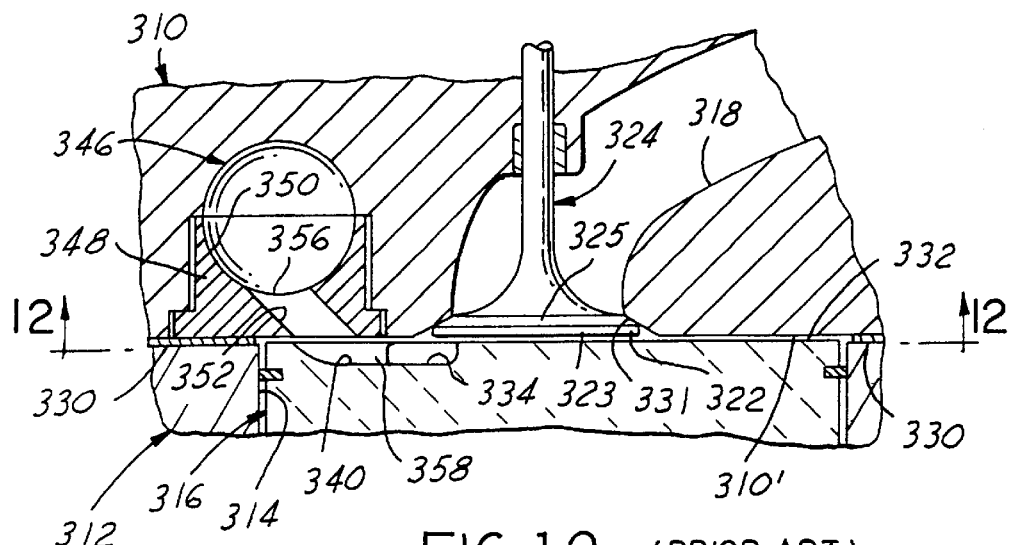
FIG. 12 is a segmented side elevational view of a cylinder head, cylinder and piston for a prior art divided chamber diesel engine, namely the trademarked "Comet" Mk Vb.
Figure 13:
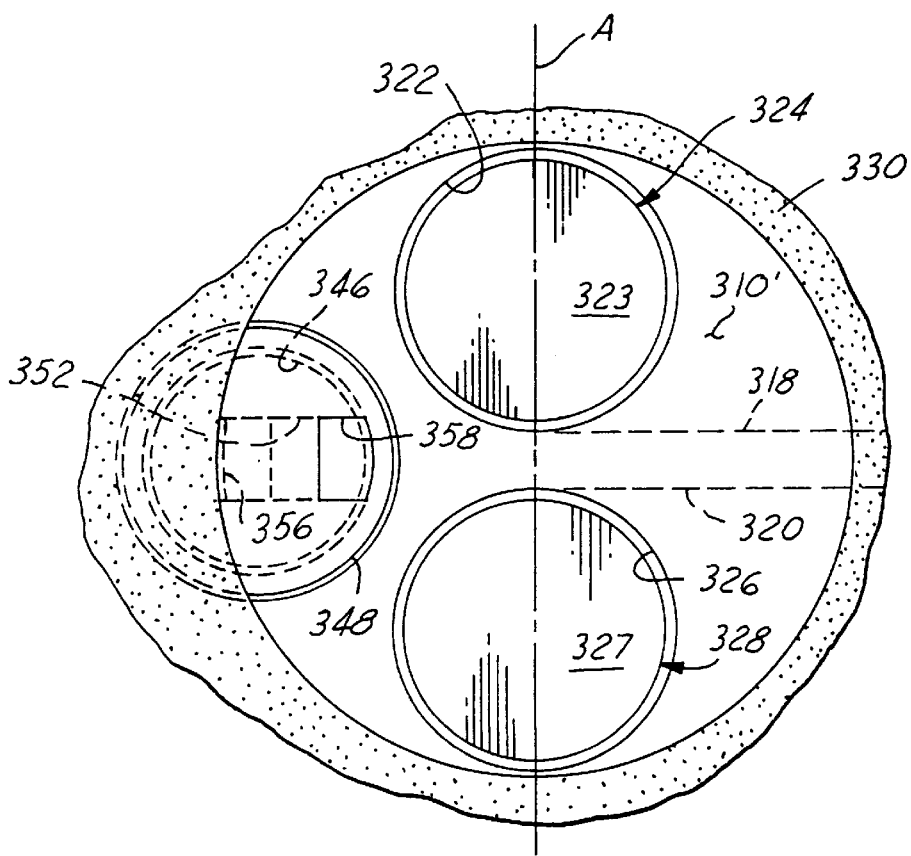
FIG. 13 is a fragmentary bottom plan view of the prior-art cylinder head of the "Comet" combustion system taken on line 12–12 of FIG. 1 and looking in the direction of the arrows.

FIGS. 12 and 13 show a cross-section of the main elements of the prior art combustion system best known by the trade name Ricardo Comet Mk Vb. This is a precombustion system dating back to 1939 and still used extensively all over the world. A cylinder head 310 and an engine block 312 of a multi-cylinder internal combustion engine are shown provided with a cylinder 314 and a piston 316. Although only one cylinder 314 and piston 316 are shown, it should be understood that any other cylinder and piston of the same engine are substantially identical in structure and function. The cylinder head 310 is fastened to the block 312 by fasteners (not shown) and the longitudinal center-line of the engine is identified by the letter "A" as seen in FIG. 12. Although not shown, each piston is conventionally connected to a crankshaft which, in turn, is connected via a timing mechanism to a camshaft that serves to time the opening and closing of an exhaust valve 328 and an intake valve 324 located in the cylinder head 310. The cylinder 314, piston 316, and cylinder head 310 form a main combustion chamber (main for its volume; actually secondary on account of its combustion function) with the top surface of the piston 316 serving as the bottom wall of the chamber while the opposed bottom surface 310' of the cylinder head 310 forms the top wall and the cylinder 314 per se forms the side wall of the main combustion chamber as the piston 316 moves downward from its TDC position seen in FIG. 12. The cylinder head 310 is provided with an intake port 318 and an exhaust port 320 which terminate at one end with an annular intake passage 322 and an annular exhaust passage 326. The annular intake passage 322 is formed between the valve head portion 323 of the intake valve 324 and the valve seat 331 formed on the cylinder head, and is adapted to be closed by the head portion 323 of the intake valve 324. The annular exhaust passage 326 is formed between the valve head portion 327 of the exhaust valve 328 and the valve seat (not shown) formed on the cylinder head, and is adapted to be closed by the head portion 327 of an exhaust valve 328. A conventional gasket 330 is interposed between the cylinder head 310 and the engine block 312 with circular cut-out aligned over the cylinder 314.

Figure 14:
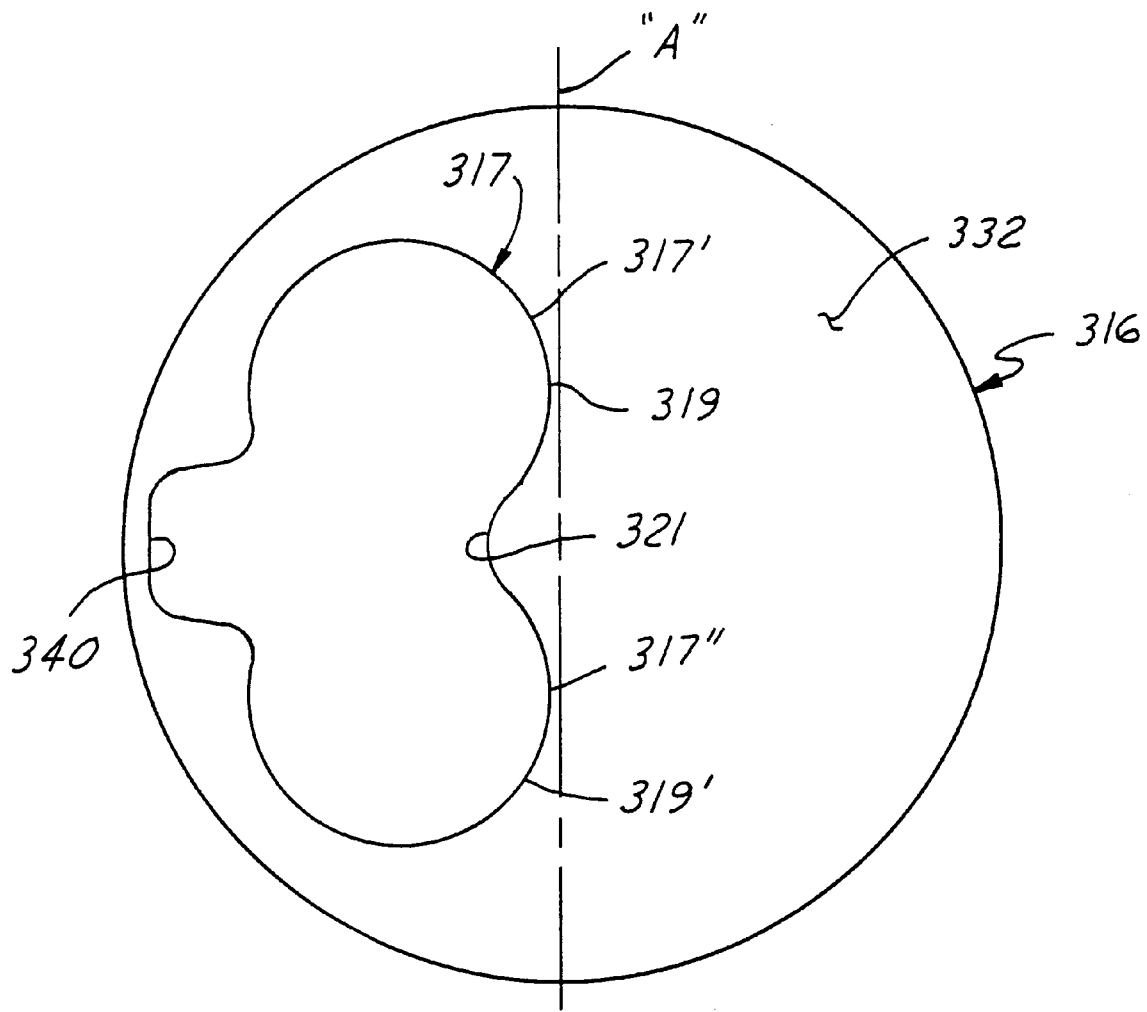
FIG. 14 is a top plan view of the prior-art piston of the "Comet" combustion system shown in FIG. 13.

As seen in FIGS. 12 and 14, the piston 316 has a flat top surface portion 332 that conforms to the flat configuration of the bottom surface 310' of the head 310. Up to this point this prior art is also similar to the new art shown in FIGS. 1 and 2. Differing from the new art as shown in FIGS. 1 and 2, however, is that a main chamber combustion cavity 317 is formed on the top surface 332 of the piston, disposed off-center towards one side of the piston. Combustion cavity 317 is mainly defined by two similar circular depressions or lobes (called "swirl pockets") 317' and 317" joined together at their common overlap. The centerline of both swirl pockets, or lobes, 317' and 317" typically, as in this case, is parallel to the longitudinal centerline of the cylinder and piston (line "A"). In the case of some Japanese engines, the centerline of both small depressions 317' and 317" is inclined with respect to the cylinder and piston longitudinal centerline "A". In both cases, a small, typically rectangular extension or channel 340 of the combustion cavity 317 extends at a 90 degree angle to the centerline of the two depressions 317' and 317"; always farther towards the edge of the piston on the near outboard side of the depression 317. The top flat surface portion 332 of the piston 316 forms a squish area with the aforementioned bottom surface 310' of the cylinder head 310. The limited distance between the squish area on the piston and the bottom surface 310' of the cylinder head 310, is called the "bump clearance".

As seen in FIGS. 12–14, the straight pre-chamber transfer passage 352 and channel 340 on the piston top direct the hot products of prechamber combustion, consisting of burnt and burning fuel and air, plus (under high-load conditions), raw and partially dissociated fuel), to travel as a hot torch in a straight transversal path towards the opposite end of the piston. The traditional belief that as such torch impinges on the splitter 321 of the piston cavity 317 it is guided by the back walls 319 and 319' to form two strong counter-swirling streams that circle many times around the pockets 317' and 317" until all the air in them is consumed is supported by FIG. 15, an advertisement by an engine manufacturer explaining the combustion process; an advertising typical of many seen since 1939 when the system was introduced. This explanation would only be true if the piston did not move so that the burning torch could not penetrate the thin bump clearance downstream of the splitter 321 and into the squish volume formed between the piston flat surface 332 and the cylinder head bottom deck 10'. Unfortunately for the nice theory, the piston does move during this process, and as the hot and fuel-rich torch front reaches the splitter 321 (at some point after TDC), it is only partially diverted into the presumed two counter-swirling streams in the "swirl pockets" 317', 317". In reality, at this point, the piston has already moved away from its TDC position and the bump clearance volume is increasing very rapidly; so that the torch stream continues into such rapidly-expanding squish volume, where the high volume of unburnt fuel in it mixes with the air migrating from the "swirl pockets" 317', 317" and burns rapidly, with great energy and temperature release. Thus, the highest temperatures over the top of the piston are found at the splitter 321 (furthermore; with impingement), and over the back side of the piston, in the squish volume. Typically, under high-load conditions, especially with turbocharged engines, the pistons can heat-check, crack and burn in these areas; more specifically, at the base of the splitter 321. This is so even as the high rate of coolant flow through the traditional transversely-drilled special cooling passage in the cylinder head, over this area (not shown), forcibly carries away, in another wasteful fashion, some of this heat. An associated undesirable effect is that the incipient-swirling motions in the "swirl pockets" 317', 317" cease; quenched from lack of air (the air having migrated over to the squish volume), and the thus quenched but still-rich unburnt dual split fronts of the torch which have penetrated both lobes of the "swirl pocket" produce smoke. The applicant's research has demonstrated that as much as 11% of the energy input to the engine is thus wasted; prevented from producing power. The poor air utilization resulting from the highly stratified fuel and air zones in the main combustion chamber, which result in smoke, is improved by the new thermodynamic solutions described in this patent, and corresponding to FIGS. 1–7.

As also seen in FIGS. 12–14, the pre-combustion chamber 346 includes a separate lower cup 348 in which the single, straight transfer passage 352 is disposed in alignment with the transversal line on the piston and cylinder which intersects the centerline joining the two lobes of the "swirl pockets" 317', 317" at a 90 degree angle. One open end of the transfer passage 325 is disposed within the prechamber lower cup; the other open end is disposed facing the channel 340. An injector and glow-plug (not shown) are disposed within the pre-combustion chamber 346.

Various changes and modifications can be made to the combustion systems described above without departing from the spirit of the invention. Such changes and modifications are contemplated by the inventor and he does not wish to be limited except by the scope of the appended claims.

I claim:

1. In an internal combustion engine having a cylinder and piston located in said cylinder for reciprocal movement, a cylinder head fixed over said cylinder and piston to form a combustion chamber, an air admission means formed in said cylinder head including an intake valve for regulating air flow into said cylinder, an exhaust discharge means formed in said cylinder head including an exhaust valve for regulating exhaust gas flow from said cylinder, a pre-combustion chamber located in said cylinder head along one side of said cylinder, said pre-combustion chamber being formed with a pair of transfer passages communicating with said combustion chamber with one end of each of said transfer passages being in proximity to said pre-combustion chamber and the other end of said pair of transfer passages being in proximity to said combustion chamber, wherein said transfer passages are oriented so that combustion gases therefrom are guided from the pre-combustion chamber along two substantially independent paths to either side of said piston's central portion thereby reducing the localized temperature over the center of said piston.

2. In an internal combustion engine having a cylinder and piston located in said cylinder for reciprocal movement, a cylinder head fixed over said cylinder and piston to form a combustion chamber, an intake passage formed in said cylinder head and an intake valve located in said passage for controlling air flow into said cylinder, an exhaust passage formed in said cylinder head and an exhaust valve located in said exhaust passage for controlling exhaust gas flow from said cylinder, a pre-combustion chamber located in said cylinder head along one side of said cylinder, said piston having pockets formed in the top surface of said piston that are sized and positioned such that when said intake valve and said exhaust valve are in a partially open position and when said piston is at or near TDC said valves are respectively received in said pockets, said pre-combustion chamber being formed with a pair of transfer passages communicating with said combustion chamber with one end of each of said transfer passages being in proximity to said pre-combustion chamber and the other end of said pair of transfer passages being in proximity to said combustion chamber, and channels formed in said piston top each interconnecting one of said transfer passages with one of said pockets so as to guide the gases from the pre-combustion chamber along independent paths toward said pockets and wherein localized temperature over the center of said piston is reduced.

3. The internal combustion engine of claim 2 wherein each of said channels is narrower proximate said one end of each of said transfer passages.

4. The internal combustion engine of claim 2 wherein said pair of channels are arranged with their longitudinal center-lines located along a pair of diverging axes.

5. The internal combustion engine of claim 2 wherein a first of said pockets is larger than a second of said pockets, and the transfer passage and channel providing products of combustion from said pre-combustion chamber to said first pocket are sized to provide greater flow capacity than the transfer passage and channel providing products of combustion from said pre-combustion chamber to said second pocket.

6. The internal combustion engine of claim 5 wherein said pair of transfer passages are joined together at a common area within the inner surface of the pre-combustion chamber.

7. The internal combustion engine of claim 5 wherein each pocket and associated channel form a substantially light-bulb shaped depression in the top surface of said piston.

8. In an internal combustion engine having a cylinder and a piston located in said cylinder for reciprocal movement, a cylinder head fixed over said cylinder and piston to form a combustion chamber, an intake passage formed in said cylinder head and an intake valve located in said passage for controlling air flow into said cylinder, an exhaust passage formed in said cylinder head and an exhaust valve located in said exhaust passage for controlling exhaust gas flow from said cylinder, a pre-combustion chamber located in said cylinder head along one side of said cylinder, said piston having pockets formed in the top surface of said piston sized and positioned such that when said intake valve and said exhaust valve are in a partially open position and when said piston is at or near TDC said intake valve and said exhaust valve are respectively received in said pockets, said pre-combustion chamber being formed with a pair of funnel-shaped transfer passages communicating with said combustion chamber with one smaller open end of each of said transfer passages being in proximity to said pre-combustion chamber and the other larger open end of said pair of transfer passages being in proximity to said combustion chamber, and a pair of separate and tapered channels formed in said top surface of said piston with one of said channels serving to interconnect said other end of one of said transfer passages with a first of said pockets and with the other of said channels serving to interconnect said other end of the other of said pair of transfer passages with a second of said pockets so as to guide the gases from the pre-combustion chamber along two substantially independent paths to said first and second pockets and thereby reduce the localized temperature over the center of said piston.

9. The internal combustion engine of claim 8 wherein each of said channels is narrower proximate said end of each of said transfer passages.

10. The internal combustion engine of claim 8 wherein said pair of channels are arranged with their longitudinal center-lines located along a pair of diverging axes.

11. The internal combustion engine of claim 8 wherein a first of said pockets is larger than a second of said pockets, and the transfer passage and channel providing products of combustion from said pre-combustion chamber to said first pocket are sized to provide greater flow capacity than the transfer passage and channel providing products of combustion from said pre-combustion chamber to said second pocket.

12. The internal combustion engine of claim 11 wherein said pair of transfer passages are joined together at a common area within the inner surface of the pre-combustion chamber.

13. In an internal combustion engine having a cylinder and piston located in said cylinder for reciprocal movement, a cylinder head fixed over said cylinder and piston to form a combustion chamber, intake passage means including a pair of intake valves for controlling air flow into said cylinder, an outlet passage including an exhaust valve for controlling exhaust gas flow from said cylinder, a pre-combustion chamber located in said cylinder head along one side of said cylinder, said piston having a first and second pocket formed in the top surface of said piston with the pockets sized and positioned such that when said intake valves are in a partially open position and when said piston is at or near TDC said pair of intake valves are received in the respective first and second pockets, a pre-combustion chamber being formed with a pair of transfer passages communicating with said combustion chamber with one open end of each of said transfer passages being in proximity to said pre-combustion chamber and the opposite other open end of said pair of transfer passages being in proximity to said combustion chamber, and a pair of separate channels formed in said top surface of said piston with one of said channels serving to interconnect said other end of one of said transfer passages with said first pocket associated with one of said intake valves and with the other of said channels serving to interconnect said other end of the other of said pair of transfer passages with said second pocket associated with the other intake valve so as to guide the gases from the pre-combustion chamber along two substantially independent paths to said first and second pockets and thereby reduce the localized temperature over the center of said piston.

14. The internal combustion engine of claim 13 wherein each of said pair of channels is narrower proximate said transfer passages.

15. The internal combustion engine of claim 13 wherein said pair of transfer passages are arranged with their longitudinal center-lines located along a pair of diverging axes.

16. The internal combustion engine of claim 13 wherein said pair of transfer passages are formed with one smaller open end being in proximity to said pre-combustion chamber, and one larger open end of said transfer passages being in proximity to said combustion chamber.

17. In an internal combustion engine having a cylinder and piston located in said cylinder, a cylinder head fixed over said cylinder and piston to form a combustion chamber, an intake passage formed in said cylinder head and an intake valve located in said passage for controlling air flow into said cylinder, an exhaust passage formed in said cylinder head and an exhaust valve located in said passage for controlling exhaust gas flow from said cylinder, a pre-combustion chamber located in said cylinder head along one side of said cylinder, said piston having first and second small combustion pockets independently formed along one side of the piston in close relationship to said pre-combustion chamber, said pre-combustion chamber being formed with a pair of transfer passages communicating with said combustion chamber with one open end of each of said transfer passages being in proximity to said pre-combustion chamber and the other open end of said pair of transfer passages being in proximity to said combustion chamber, and a pair of separate channels formed in said top surface of said piston with one of said channels serving to interconnect said other one of said transfer passages with a first of said pockets and with the other of said channels serving to interconnect said other end of the other of said transfer passages with a second of said pockets so as to guide the gases from the precombustion chamber along two substantially independent paths to said first and second pockets and thereby reduce the localized temperature over the center of said piston.

18. The internal combustion engine of claim 17 wherein each of said channels is narrower proximate said one end of each of said transfer passages.

19. The internal combustion engine of claim 17 wherein said pair of channels are arranged with their longitudinal center-lines located along a pair of diverging axes.

20. The internal combustion engine of claim 17 wherein said pair of transfer passages communicating with said combustion chamber are formed with one smaller open end of said transfer passages being in proximity to said pre-combustion chamber and the other larger open end being in proximity to said combustion chamber.

21. The internal combustion engine of claim 17 wherein said pair of transfer passages are joined together at a common area within the inner surface of the pre-combustion chamber.

22. The internal combustion engine of claim 17 wherein each pocket and associated channel form a substantially light-bulb shaped depression in the top surface of said piston.

23. In an internal combustion engine having a cylinder and piston located in said cylinder, a cylinder head fixed over said cylinder and piston to form a combustion chamber, an intake passage formed in said cylinder head and an intake valve located in said passage for controlling air flow into said cylinder, an exhaust passage formed in said cylinder head and an exhaust valve located in said passage for controlling exhaust gas flow from said cylinder, a pre-combustion chamber located in said cylinder head along one side of said cylinder, said piston having a depressed combustion pocket formed in its top surface and along one side of the piston in close relationship to said prechamber, said combustion pocket being configured as two generally circular smaller lobes interconnected to each other along a common longitudinal axis, said pre-combustion chamber being formed with a pair of transfer passages with one open end of each of said transfer passages being in proximity to said pre-combustion chamber and the other opposite open end of said pair of transfer passages being in proximity to said combustion chamber, and a pair of separate channels formed in said top surface of said piston with one of said channels serving to interconnect said other one of said transfer passages with a first of said small lobes forming part of the large combustion pocket and with the other of said channels serving to interconnect said other end of the other of said transfer passages with a second of said small lobes forming part of said larger combustion pocket so as to guide the gases from the precombustion chamber along two substantially independent paths to said first and second pockets and thereby reduce the localized temperature over the center of said piston.

24. The internal combustion engine of claim 23 wherein each of said channels is narrower proximate said one end of each of said transfer passages.

25. The internal combustion engine of claim 23 wherein said pair of channels are arranged with their longitudinal center-lines located along a pair of diverging axes.

26. The internal combustion engine of claim 23 wherein said pair of transfer passages communicating with said combustion chamber are formed with one smaller open end of said transfer passages being in proximity to said pre-combustion chamber and the other larger open end being in proximity to said combustion chamber.

27. The internal combustion engine of claim 23 wherein said pair of transfer passages are joined together at a common area within the inner surface of the pre-combustion chamber.

28. In an internal combustion engine having a cylinder and piston located in said cylinder, a cylinder head fixed over said cylinder and piston to form a combustion chamber, an intake passage formed in said cylinder head and an intake valve located in said passage for controlling air flow into said cylinder, an exhaust passage formed in said cylinder head and an exhaust valve located in said passage for controlling exhaust gas flow from said cylinder, a pre-combustion chamber located in said cylinder head along one side of said cylinder, said piston having a substantially planar top surface, said pre-combustion chamber being formed with a pair of transfer passages communicating with said combustion chamber with one end of each of said transfer passages being in proximity to said pre-combustion chamber and the other open end of said pair of said transfer passages being in proximity to said combustion chamber, said transfer passages arranged with their longitudinal center-lines located along a pair of diverging axes so as to guide the gases from the precombustion chamber along two substantially divergent independent paths to provide extended coverage for the discharge products of prechamber combustion over the piston and thereby reduce the localized temperature over the center of said piston and obtain improved air utilization.

29. The internal combustion engine of claim 28 wherein each of said channels is narrower proximate said one end of each of said transfer passages.

30. The internal combustion engine of claim 28 wherein said pair of transfer passages communicating with said combustion chamber are formed with one smaller open end of said transfer passages being in proximity to said pre-combustion chamber and the other larger open end being in proximity to said combustion chamber.

31. The internal combustion engine of claim 28 wherein said pair of transfer passages are joined together at a common area within the inner surface of the pre-combustion chamber.

32. In an internal combustion engine having a cylinder and piston located in said cylinder, a cylinder head fixed over said cylinder and piston to form a combustion chamber, an intake passage formed in said cylinder head and an intake valve located in said passage for controlling air flow into said cylinder, an exhaust passage formed in said cylinder head and an exhaust valve located in said passage for controlling exhaust gas flow from said cylinder, a pre-combustion chamber located in said cylinder head along one side of said cylinder, said piston having a substantially planar top surface, said pre-combustion chamber being formed with a pair of transfer passages with one open end of each of said transfer passages being in proximity to said pre-combustion chamber and the other open end of said pair of said transfer passages being in proximity to said combustion chamber, said transfer passages arranged with their longitudinal center-lines located along a pair of diverging axes, and a pair of small depressions formed on the planar top of the piston in a generally tapered teardrop configuration, said pair of small depressions located on said piston in alignment with said divergent pair of transfer passages so as to guide combustion gases from the precombustion chamber in a path of low flow resistance from the main combustion chamber wherein said gases are spread over the top of said piston to inhibit localized concentration of heat on said piston.

33. The internal combustion engine of claim 32 wherein each of said channels is narrower proximate said one end of each of said transfer passages.

34. The internal combustion engine of claim 32 wherein said pair of transfer passages communicating with said combustion chamber are formed with one smaller open end of said transfer passages being in proximity to said pre-combustion chamber and the other larger open end being in proximity to said combustion chamber.

35. The internal combustion engine of claim 32 wherein said pair of transfer passages are joined together at a common area within the inner surface of the pre-combustion chamber.

\* \* \* \* \*